United States Patent
Schwarzband et al.

(10) Patent No.: US 10,636,140 B2
(45) Date of Patent: Apr. 28, 2020

(54) TECHNIQUE FOR INSPECTING SEMICONDUCTOR WAFERS

(71) Applicant: Applied Materials Israel Ltd., Rehovot (IL)

(72) Inventors: Ishai Schwarzband, Or-Yehuda (IL); Sergey Khristo, Ashdod (IL); Yan Avniel, Rehovot (IL)

(73) Assignee: APPLIED MATERIALS ISRAEL LTD., Rehovot (IL)

( * ) Notice: Subject to any disclaimer, the term of this patent is extended or adjusted under 35 U.S.C. 154(b) by 137 days.

(21) Appl. No.: 15/982,876

(22) Filed: May 17, 2018

(65) Prior Publication Data
US 2018/0336671 A1 Nov. 22, 2018

Related U.S. Application Data

(60) Provisional application No. 62/508,302, filed on May 18, 2017.

(51) Int. Cl.
*G06T 7/00* (2017.01)
*G06T 7/564* (2017.01)
(Continued)

(52) U.S. Cl.
CPC ............ *G06T 7/001* (2013.01); *G06T 7/0004* (2013.01); *G06T 7/507* (2017.01); *G06T 7/564* (2017.01);
(Continued)

(58) Field of Classification Search
CPC combination set(s) only.
See application file for complete search history.

(56) References Cited

U.S. PATENT DOCUMENTS

| 6,353,222 | B1 | 3/2002 | Dotan |
| 2006/0043292 | A1* | 3/2006 | Matsui ................ H01J 37/28 250/310 |

(Continued)

FOREIGN PATENT DOCUMENTS

| JP | 2006064421 A | 3/2006 |
| KR | 101196219 B1 | 11/2012 |
| WO | 2015112444 A1 | 7/2015 |

OTHER PUBLICATIONS

Fukaya, Hiroshi, et al., "New CD-SEM metrology method for the side wall angle measurement using multiple detectors," Photomask and Next Generation Lithography Mask Technology XVIII, edited by Yoshio Konishi, Proc. of SPIE vol. 8081 80810G-1, Yokohama, Japan, Apr. 13, 2011.

(Continued)

*Primary Examiner* — Zhiyu Lu
(74) *Attorney, Agent, or Firm* — Lowenstein Sandler LLP

(57) ABSTRACT

A height of a pattern on a semiconductor wafer is determined by comparing a measured image of the pattern with a predicted image of the pattern, as produced by a shadow model. An estimated height of the pattern is provided as an input to the shadow model. The shadow model produces occluding contours that are used to generate predicted images. A set of predicted images are generated, each predicted image being associated with an estimated height. The estimated height corresponding to the predicted image most closely matching with the measured image is used as the height calculated by the shadow model.

18 Claims, 8 Drawing Sheets

(51) Int. Cl.
  *G06T 7/60* (2017.01)
  *G06T 7/507* (2017.01)
(52) U.S. Cl.
  CPC ...... *G06T 7/60* (2013.01); *G06T 2207/10061* (2013.01); *G06T 2207/20076* (2013.01); *G06T 2207/30148* (2013.01)

(56) References Cited

U.S. PATENT DOCUMENTS

| | | | | |
|---|---|---|---|---|
| 2006/0245636 A1* | 11/2006 | Kitamura | ................ | G06K 9/00 382/149 |
| 2009/0087025 A1* | 4/2009 | Ma | ................ | G06K 9/00771 382/103 |
| 2010/0193686 A1 | 8/2010 | Watanabe et al. | | |
| 2012/0217392 A1* | 8/2012 | Murakawa | ............ | G01B 15/00 250/307 |
| 2012/0318976 A1* | 12/2012 | Matsumoto | ........... | H01J 37/244 250/307 |
| 2013/0070078 A1 | 3/2013 | Takagi et al. | | |
| 2013/0264480 A1 | 10/2013 | Murakawa et al. | | |
| 2014/0146297 A1* | 5/2014 | Vainer | .................... | G01N 21/94 355/30 |
| 2015/0311129 A1* | 10/2015 | Miller | .................... | H01L 22/26 438/9 |
| 2017/0228490 A1* | 8/2017 | Chung | ................ | G06F 17/5081 |
| 2017/0343340 A1* | 11/2017 | Kawada | ................. | G01B 15/00 |
| 2018/0004355 A1* | 1/2018 | Shahar | .................... | G06T 7/593 |

OTHER PUBLICATIONS

International Search Report and Written Opinion dated Sep. 14, 2018 for International Application PCT/US2018/033474, International Filing Date May 18, 2018, 10 pages.

* cited by examiner

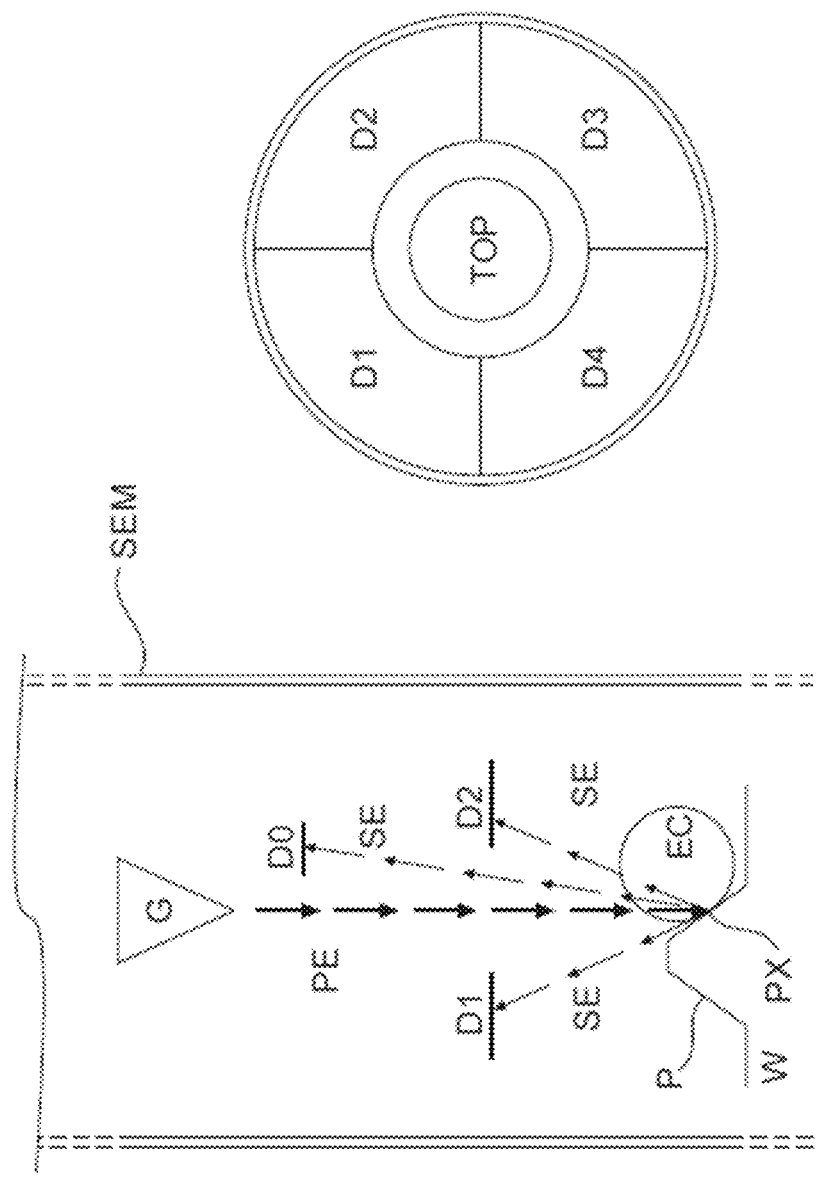

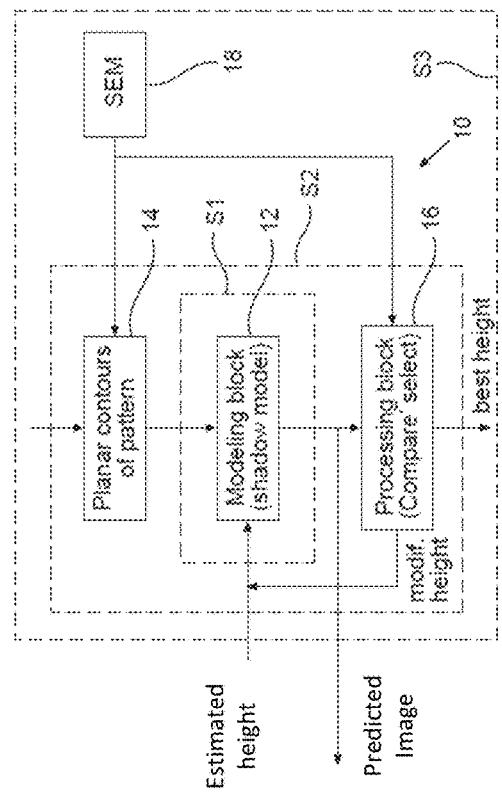
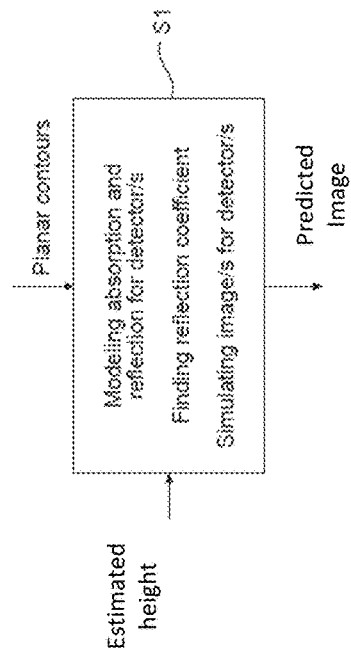
FIG. 3A
FIG. 3B

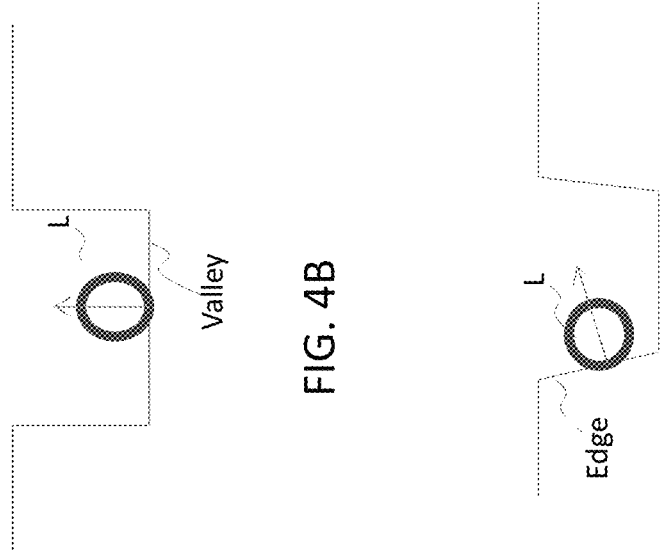
FIG. 4B
FIG. 4C
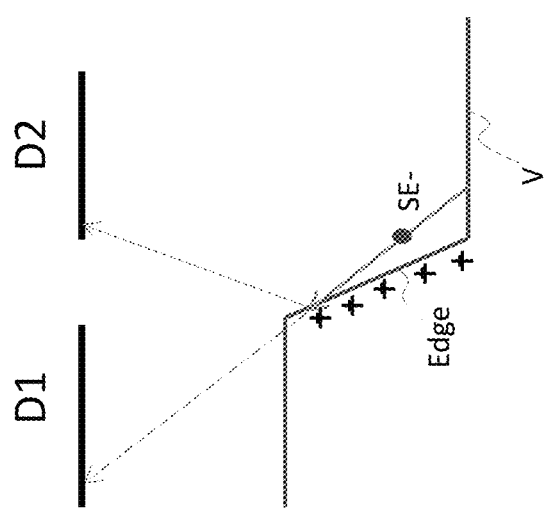
FIG. 4A

TECHNIQUE FOR INSPECTING SEMICONDUCTOR WAFERS

RELATED APPLICATION

The present application claims the benefit of priority from U.S. Provisional Application No. 62/508,302, filed May 18, 2017, entitled, "TECHNIQUE FOR INSPECTING SEMICONDUCTOR WAFERS," which is incorporated herein by reference in its entirety.

TECHNICAL FIELD

The present disclosure generally relates to inspection of semiconductor wafers, and more specifically, relates to determining height of a pattern on a semiconductor wafer using a shadow model.

BACKGROUND

There are some known techniques for measuring dimensions of patterns located on a semiconductor wafer. It may be needed to measure height (or depth) of a pattern, or a particular feature of a pattern, such as an oxide recess or a fin of a device. One of the techniques to measure height is referred to as a "shadow effect." The technique uses a detector, located at a specific position with respect to the pattern, where the detector does not receive part of the responsive electrons because of occlusion by portions of the pattern, such as a sidewall, thereby creating a shadow.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In certain implementation, the disclosure performs a computer-implemented method for determining a height of a pattern on a semiconductor wafer, the method comprising: obtaining a measured image of the pattern, wherein the measured image of the pattern is indicative of the height of the pattern; producing, using a shadow model, a predicted image of the pattern, wherein the predicted image is associated with a function of an estimated height of the pattern, and wherein the estimated height of the pattern is provided as an input to the shadow model; and, calculating, by a computer processor, the height of the pattern by comparing the measured image of the pattern with the predicted image of the shadow of the pattern.

Implementations of the disclosure may also correspond to a system for determining a height of a pattern on a semiconductor wafer. The system includes a memory; and a computer processor, operatively coupled with the memory, to perform the following: obtain a measured image of the pattern, wherein the measured image of the pattern is indicative of the height of the pattern; produce, using a shadow model, a predicted image of the pattern, wherein the predicted image is associated with a function of an estimated height of the pattern, and wherein the estimated height of the pattern is provided as an input to the shadow model; and, calculate the height of the pattern by comparing the measured image of the pattern with the predicted image of the shadow of the pattern.

In some implementations, a non-transitory computer readable medium may include instructions, which, when executed by a processing device, cause the processing device to perform the above-mentioned tasks.

BRIEF DESCRIPTION OF THE DRAWINGS

The present disclosure will be understood more fully from the detailed description given below and from the accompanying drawings of various implementations of the disclosure.

FIGS. 2A and 2B show the side view and top view respectively of a schematic set-up of an SEM for scanning a semiconductor wafer with an electron beam and for detecting distribution of electrons between a number of electron detectors, in accordance with some embodiments of the present disclosure.

FIG. 3A illustrates a functional block diagram schematically illustrating the system and its sub-systems, in accordance with some embodiments.

FIG. 3B illustrates a functional block diagram of a particular sub-system, in accordance with some embodiments.

FIG. 4A-4C illustrate shadow computation with an absorption-reflection model, in accordance with some embodiments of the present disclosure.

DETAILED DESCRIPTION

Figure 1:
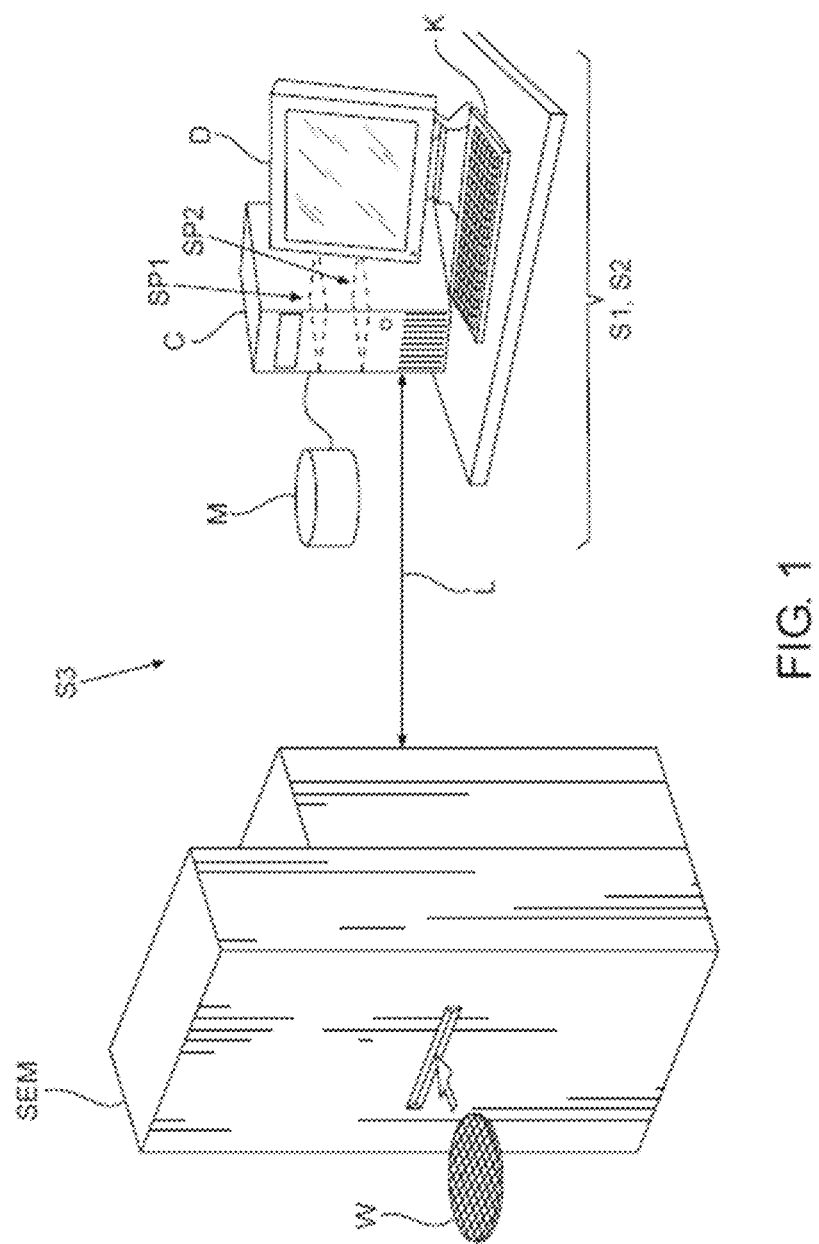
FIG. 1 illustrates a system for determining height of a pattern on a semiconductor wafer, in accordance with some embodiments of the present disclosure.

Aspects of the present disclosure are directed to inspection of a semiconductor wafer, and specifically, determining height of a particular pattern on the semiconductor wafer. A "pattern" should be understood as one or more features provided on a semiconductor wafer. For the purpose of this disclosure, a pattern typically has a height or depth that distinguishes it from the wafer's planar base, sometimes referred to as "valley." Patterns have sidewalls or edges. A pattern creates a "shadow" due to its height with respect to the valley.

Typically, an electron beam is irradiated on an observation region of a sample surface, and an image (for example, a scanning electron microscope (SEM) image) is acquired based on a detection signal of secondary electrons from a detector disposed obliquely above the observation region. A length of a shadow of a pattern appearing in the image is detected. Then, a height of the pattern is calculated by a formula on the basis of the detected length of the shadow and an apparent angle of the detector to the sample surface obtained in advance. An intensity distribution of the secondary electrons on a line orthogonal to an edge of the pattern is extracted, and the length of the shadow of the pattern is obtained as a distance between two points where a recess portion of the intensity distribution intersects a predetermined threshold.

A metrology method known as Critical Dimension SEMs (CD-SEM) may be used to measure the sidewall angle of a pattern. The height and edge width of pattern can be measured by the analysis of the signal intensity profile of each channel from multiple detectors in CD-SEM. The edge width is measured by the peak width of the signal intensity profile. But it is not possible to measure the accurate edge width of the pattern, if the edge width is smaller than the primary electron beam diameter.

The above-mentioned CD-SEM approach determines dimensions of features on a semiconductor wafer mainly by utilizing trigonometrical calculations performed using precise measurements of the SEMs. None of the techniques uses a model to calculate the height of a pattern from an estimated height rather than requiring a precise on-wafer measurement. The present disclosure uses a shadow model to accurately predict a height of a pattern without precise on-wafer measurements.

In this disclosure, a height of a pattern on a semiconductor wafer is determined by comparing a measured image of the pattern with a predicted image of the pattern, as produced by a shadow model. An estimated height of the pattern is provided as an input to the shadow model. The shadow model produces occluding contours that are used to generate predicted images. A set of predicted images are generated, each predicted image being associated with an estimated height. The estimated height corresponding to the predicted image most closely matching with the measured image is used as the height calculated by the shadow model.

Advantages of the present disclosure include, but are not limited to, use of a geometrical algorithm, which is practically not dependent on physical processes, making the process very robust and reliable. Calibrations needed for the process are the same as that is needed for other wafer inspection techniques, such as height map, i.e. no additional calibration is needed.

The proposed technique of inspection/measurements can be implemented using SEM measurements based on all types of electrons, including secondary electrons emitted by a surface of a semiconductor wafer in response to an electron beam of SEM. Measured images can be obtained by collecting SEM image data from the detectors and applying signal processing to the collected data. Measured image can also be image data previously stored.

As has been noted above, the proposed concept enables an alternative approach to precise measurements by using shadow images. For example, it allows estimation of the pattern height without performing complex measurements but based on measured image data (for example, SEM-images) derived from detecting electrons, since the measured image data may be then iteratively compared with predicted shadow images modeled by the shadow model, to thereby obtain more accurate estimate of the pattern height.

FIG. 1 illustrates an embodiment comprising a system S3 that has two sub-systems S1 and S3 and a measurement system, such as an SEM. System S1 comprises a modeling processor marked as SP1 (which may comprise a hardware unit, software product or software application) associated with a memory (M), for obtaining a predicted image of a pattern on a semiconductor wafer (for example, W) by using a shadow model. The second system S2 further comprises a processor marked SP2 for processing a measured image, processing the predicted image and comparing it with the measured image. The systems S1 and S2 may be placed in a free standing computer C provided with a display D and a keyboard K. The computer C is in communication with a SEM via a communication line L.

The extended system S3 may further comprise the SEM incorporating a source of an electron beam and one or more detectors which are positioned so as to monitor the semiconductor wafer W, when inserted in the SEM, to collect brightness data. SEM may process the collected data into a measured image or may supply the collected data to the second system S2 for forming and processing the measured image there-inside.

FIGS. 2A and 2B illustrate a set-up for collecting data in the SEM to produce a measured image. FIG. 2A shows a side view and FIG. 2B shows the top view. An electron gun G scans the wafer W having a pattern P, by an electron beam of primary electrons PE. Secondary electrons SE, being produced by collision of PE with the pattern P on the wafer W, comprise electrons that are emitted or reflected from the wafer and which are detected by detectors D0 (top detector), and additional detectors D1, D2, D3, D4, referred to as the split detectors. Each one of the detectors detects its portion of the SE and thus perceives its specific portion of brightness distribution, depending on location of the pattern and on location of the specific detector. FIG. 2A shows an electron cloud EC formed around the location on the wafer (pixel PX) where the PE beam currently hits pattern P; detectors D0, D1, D2 therefore receive their portions of secondary electrons SE created at PX.

FIG. 3A is a block diagram which schematically illustrates sub-system 1 (S1) for modeling an predicted image of pattern's shadow on semiconductor wafer W. Subsystem S1 can be part of another larger subsystem 2 (S2) that uses the model of S1 for determining height of the pattern.

Flowchart 10 in FIG. 3A shows the operation of S1, S2 and S3 in combination with one another. S1 comprises a modeling block 12 which receives information on planar contours of the pattern of interest (for example, from block 14 of S2, or, from a program or an operator), and information on the pattern's estimated height. By applying a shadow model, block 12 produces a predicted image of shadow for the pattern. The predicted image may be created per detector or as a combined predicted image and may further be used for various types of inspection of the wafer W. It may, for example, be used for determining height of the pattern in S2. S2 comprises sub-system S1 that obtains planar contours from a measured image (block 14). The measured image from the SEM is also fed to the processing block 16 for comparing with predicted image calculated by modeling block 12. The measured image may be for example, an image perceived by a specific detector or a combined image built from per-detector images.

The predicted image is recalculated for various estimated heights, to iteratively arrive at the best height which results in the minimal difference between the compared pair of real and predicted images. The pair of images may be compared per pixel, and a cumulative error CE may be determined for each specific predicted image which was calculated for a specific height value. Upon modeling a set of predicted images for a set of estimated height values, the minimal cumulative error (MCE) may be determined by system S2, and the best height can be selected as the height value which brought to the MCE.

System 3 (S3) is an extended system that comprises S2 and SEM (18) with detectors (not shown) which together supply the measured image data to system S2.

FIG. 3B shows simplified method performed by S1 (by modeling block 12). Block 12 receives information on planar (2D) contours of the pattern and on estimated height thereof. First, a shadow model is used to model absorption (that results in the actual shadow or low brightness regions) and reflection (that results in the bright regions) around the pattern for one or more specific detectors. The model is thus sometimes called an absorption-reflection model. The method proceeds to finding a reflection coefficient and other parameters characterizing materials of the wafer, for further simulation. The method then proceeds to simulate predicted image(s) for the detector/s based on results of the first and the second steps. The predicted image(s) may be per detector images or a cumulative image.

The model (and the modeling step of the method) may comprise determining an occluding contour being a line connecting two or more shadowing points (or edge points), wherein the shadowing points have an estimated height of the pattern and affect propagation of the electrons to the specific detector. The shadowing points are calculated based on an edge detection technique. The planar contours of the pattern are transformed by the model into an occluding contour per detector. The model does not depend on which edge detection technique is used to identify the shadowing points.

The model allows building a multi-pixel brightness picture (being the predicted image) of the pattern for each of the detectors. The "shadow" model allows predicting a picture of distribution of brightness expected on and around the pattern, created by the determined planar (2D) contour having an estimated value of the pattern height and observed from at least one specific detector.

In further details, the model is designed to predict, per pixel, the change in observed brightness (as viewed in each of the detectors), based on at least some of the following considerations: proximity of a specific pixel to a neighboring occluding contour, the estimated height corresponding to neighboring occluding contour, and, relative position between said pixel, said neighboring occluding contour and the detector (since electrons occluded by that contour from one detector may be partially reflected towards another detector).

The absolute brightness of a pixel also depends on additional information: the material of the surface, the parameters of the electron beam and the parameters of a detector. When all such additional information is provided, intensity of each pixel can be computed in full. When such additional information is absent, the model allows to compute relative change in pixel brightness, compared for example to another pixel located further away from an occluding pattern; the provided assumption can be made about same material properties for both pixels, or relative to pixels of some canonical pattern in another image taken under similar conditions, where all material and geometrical properties are known in advance.

In cases when the model is not full, for example when wafer material information is missing, the simulated and the measured images may be brought to the similar range of grey-level values before the comparison. For example, certain chosen area in both images, such as some place assumed to be not occluded, can be brought to be of a certain grey level in both images by way of mathematical operations which are applied to entire images. This will make comparison of images, by way of subtracting one from another, meaningful.

Figure 5A:
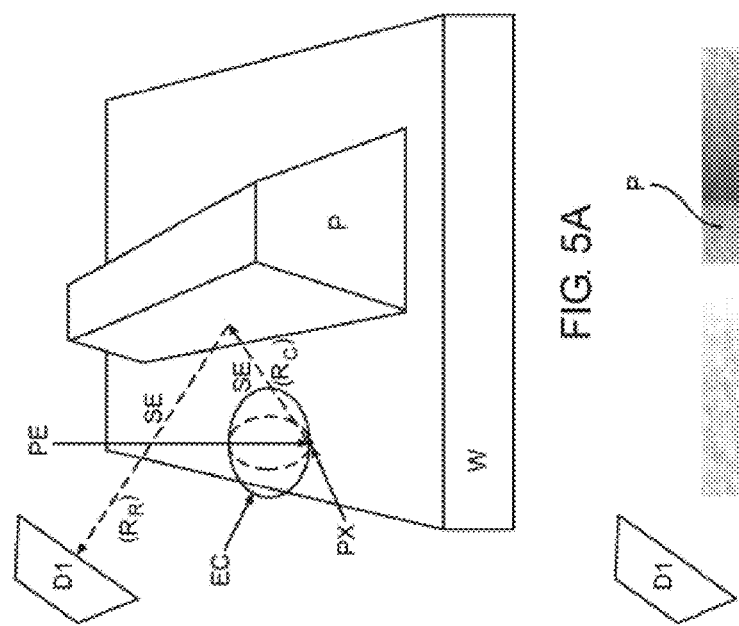
FIG. 5A illustrates modeling absorption and reflection by a pattern's edge in order to simulate a shadow as observed from a specific detector, in accordance with some embodiments of the present disclosure.

FIG. 4A schematically shows the basic function of a shadow model known as the absorption-reflection model. When SEM beam impinges on a surface on the wafer, secondary electrons (SE) are emitted. When SE collides with the sidewall (edge), a part of them is absorbed (at absorption rate $r_a$), and another part of them is reflected (at reflection rate $r_r$), such that $(r_a+r_r)=1$. The assumption is that the reflection is mirror-like. D1 and D2 are detectors along the SE line-of-sight and on the side, respectively, such that when SE is reflected by the sidewall, D2 detects a signal from reflected electrons, and D1 detects signal from absorbed electrons. The model assumes that profile pattern is trapezoidal (as shown in FIG. 5A), and the sidewalls (edges) are locally smooth. FIG. 4B shows that in the shadow model, it is assumed that in the valley, Lambertian distribution L is flat and is isotropic in azimuth. FIG. 4C shows that in the shadow model, at the edges (sidewalls), Lambertian is tilted and is not isotropic in azimuth. The gradient is needed in order to estimate the direction of the Lambertian.

Some of the modeling steps will be explained in more details with the aid of FIGS. 5-7 below.

Figure 5B:
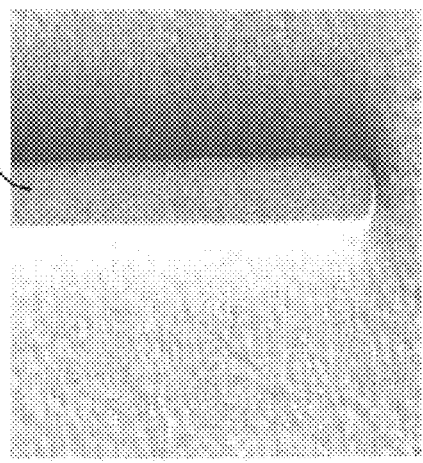
FIG. 5B shows an SEM image showing a shadow, in accordance with an embodiment of the present disclosure.

FIG. 5A and FIG. 5B show what happens on the pattern P upon irradiating a specific pixel PX of the wafer W with primary electrons PE (FIG. 5A) and how the real SEM image is seen by D1 (left detector, shown also on FIG. 5B). The left hand side of the pattern P is brighter, since a considerable portion $R_C$ of secondary electrons SE of the electron cloud EC s with the pattern P and then are partially reflected (portion of those reflected electrons is marked $R_R$). At the same time, part of the colliding electrons is absorbed ($R_S$). The reflected electrons may reach detector D1 and may be other detectors (not shown for clarity).

In FIG. 5B, it is shown that the right hand side of the pattern P is darker (shadowed). Reflection rate $R_R$ (say, a fraction ~0.12, i.e. 12% of the colliding electrons $R_C$) and absorption rate $R_S$ (s-shadow) may be modeled as being proportional to collision rate $R_C$.

In presence of a neighboring pattern/feature P, electrons yielding from the wafer can be absorbed by a feature edge and create shadow, as indicated by the absorption fraction ($R_S$), or, change its direction and reach one or another detector thus creating reflection, as indicated by the reflection fraction ($R_R$). Rates $R_S$ and $R_R$ are proportional to collision rate $R_C$. The relationship is simplified into the equation, $R_S=R_C-R_R$. In other words, the shadow model is indicative of loss of yield caused by shadowing, where the loss of yield is caused by the absorption of electrons by the sidewall of the pattern, or by reflection of light away from the detector, where the term "yield" refers to the signal at the detector.

Figure 6:
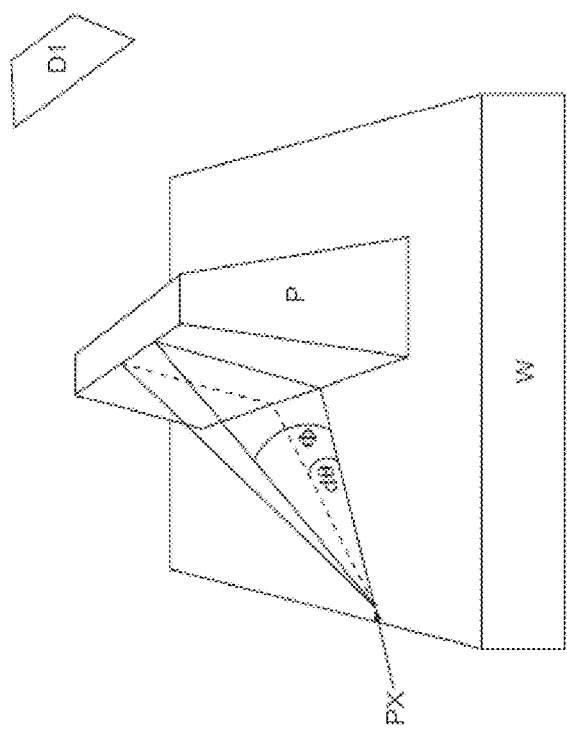
FIGS. 6 and 7 schematically illustrate effect of a sidewall for a specific pixel located near the sidewall, and how it is modeled, according to an embodiment of the present disclosure.

FIG. 6 schematically illustrates how the collision rate $R_C$ may be determined. The illustration shows a pattern P and a pixel of interest PX on the valley part of wafer W, where $\phi$ is an elevation angle between the pixel and the pattern P's sidewall, and $\Theta$ is an azimuthal angle on the wafer W (where $d\Theta$ is the angular distance between two points). The calculations allow determining a portion of colliding electrons for the specific angle $\Theta$, followed by the calculation for all angles $\Theta$, thereby enabling to estimate the shadow resulting from the colliding electrons as would be detected by the detector D1.

The azimuthal differential of the electrons hitting the side wall can be expressed by the equation:

$$O_i(\theta) = p(e \in \phi_1, e \in \text{Side}, \theta) = \int_0^{\phi_1(\theta)} F_S(\phi)L(\phi, \theta, \phi_0, \theta_0)d\phi$$

wherein, i=number of a detector, L=Lambertian distribution, φ=angular height of the neighbor pattern, $F_i(\phi, \theta)$=probability of reaching detector for a SE with direction (φ, θ), (φ$_0$, θ$_0$)=elevation and azimuth of normal vector of local surface.

Total collision rate is $$R_c \stackrel{def}{=} P(e \in \phi_1, e \in \text{Side}) = \int_0^{2\pi} O_i(\theta)d\theta$$

As described above, collision is divided between absorption and reflection. Reflection is computed by subtracting a part of the electron rate of the "target" detector and adding this part to another "mirror" detector (as mentioned with reference to FIG. 4A)

Figure 7:
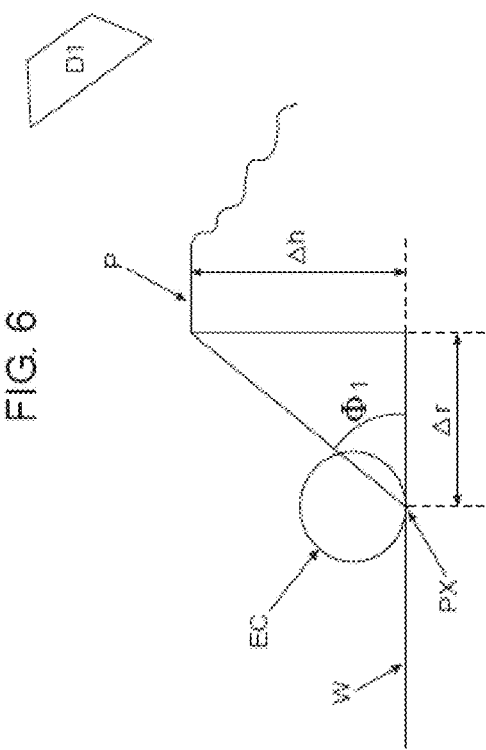

FIG. 7 schematically illustrates and explains how the predicted shadow image may be modeled in a valley region between pattern edges. Surface normal is a plain valley surface of W. Angular shadowing in side detectors is an expression determining probability of a secondary electron to collide with the wall of P within the angle φ, as a function of angle θ (see FIG. 6). Shadowing in side detectors in a sector θ allows determining probability of colliding (and thus shadowing within θ) for a specific detector, say D1. For example, shadowing can be expressed as follows for the angle φ1, height Δh and distance Δr from the pattern P edge:

$$\text{Surface normal} = \left(\frac{\pi}{2}, 0\right); \tau = tg\phi_1 = \frac{\Delta h}{\Delta r}$$

$$O(\tau) \stackrel{def}{=} \int_0^{arctg(\tau)} F_S(\phi)L\left(\phi, 0, \frac{\pi}{2}, 0\right)d\phi$$

$$\text{Surface normal} = \left(\frac{\pi}{2}, 0\right); \tau = tg\phi_1 = \frac{\Delta h}{\Delta r}$$

Angular shadowing in side detectors can be expressed as:

$$O_a(\theta) \stackrel{def}{=} p(e \in \phi_1, e \in \text{Side}, \theta) = O(\tau(\theta))$$

Shadowing in side detectors in a sector Θ can be expressed as:

$$R_c \stackrel{def}{=} P(e \in \phi_1, e \in \text{Side}) = \int_\Theta O_a(\theta)d\theta$$

The absorption and the reflection may be finally processed as follows, for determining shadow of a pattern for a specific detector. Detector signal Ri is formed based on a signal rate (portion) on the open area Rio and depends on the portion of absorbed electrons ($R_S$) and a portion which was reflected to that detector from another direction ($R_R$): $R_i = R_{io}*(1-R_S+R_R)$.

The formula of the shadow model, which allows describing the shadow detected by a specific detector, may be written down as follows:

$$R_i = R_{i0} - R_{ci} + \sum_{k \neq i} R_{ck} \cdot \rho_R$$

wherein $R_{Ci}$ is a rate (portion) of electrons which were directed to our specific $i^{th}$ detector but not arrived to it due to collision; $R_{Ck}$ is a rate (portion) of electrons which were directed to another, kth detector (k≠i) but due to collision could arrive to our $i^{th}$ detector; ρR is a reflection coefficient estimating which part of the colliding electrons was reflected.

The above formula of the shadow model indicates that the signal $R_i$ which could be received by a specific $i^{th}$ detector owing to electrons which would arrive to that detector from a semiconductor wafer scanned by an electron beam, depends on proportion of the electrons which a) would arrive to the detector directly and b) would collide with a specific pattern on the wafer and arrive to the $i^{th}$ detector partially and/or indirectly. To determine the signal, the shadow model takes into consideration geometric position of a specific pixel on the wafer relative to neighboring patterns, height of the neighboring patterns, absorption of electrons by the neighboring patterns and reflection of electrons from the neighboring patterns.

Figure 8A:
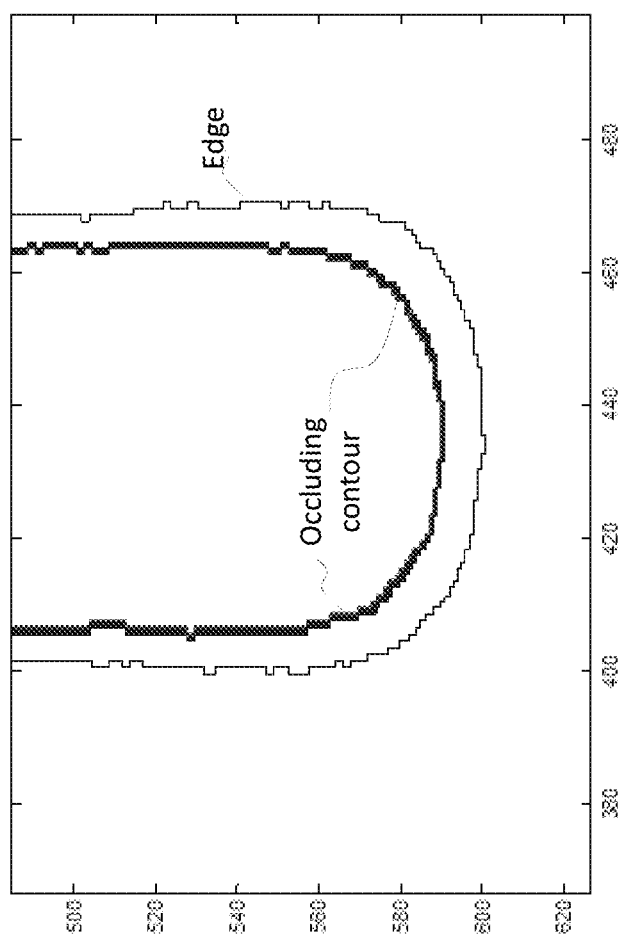
FIG. 8A shows how an occluding contour is generated from a planar contour of an edge, according to an embodiment of the present disclosure.

FIG. 8A shows an example of an occluding contour generated by a shadow model from the planar contour of an edge of a pattern, e.g., the pattern shown in FIG. 5B. The X and Y axes are arbitrary dimensions (not to scale). The occluding contour is generated only from the parts of the edge that actually produce the shadow. Other points in the planar contour are not important for the absorption-reflection model.

Figure 8B:
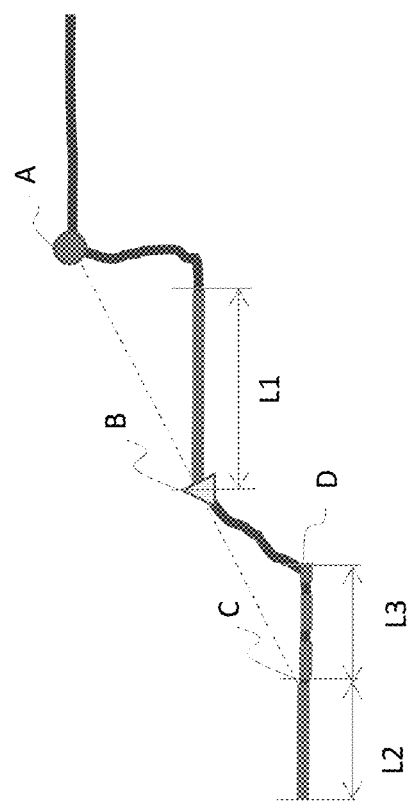
FIG. 8B shows how a shadow model takes into account area of impact of each point on an occluding contour, according to an embodiment of the present disclosure.

FIG. 8B shows how the occluding contour is generated from a 2D planar contour. For example, point A is an edge point on the planar contour that impacts the areas covered by line segments L1 and L2. Segments L1 and L2 are part of the occluding contour. Point B impacts the area covered by the dashed line segment L3 (between points C and D). In general, the shadow model estimates impacted points for each point of occluding contour for each direction, and add shadow values to the impacted points.

The shadow model produces a predicted image from the occluding contour. A set of predicted images are generated, each predicted image being associated with an estimated height. Each predicted image is compared with the measured image. The comparison is made under the assumption that the height of the pattern in the measured field of view is substantially the same. If that is not the case, the field of view can be changed. This can be done during the set-up stage during measurement, and not part of the modeling process. With proper field of vie set, the estimated height corresponding to the predicted image that is the closest match with the measured image (e.g. image obtained from the SEM) is determined to be the height of the pattern.

Figure 9:
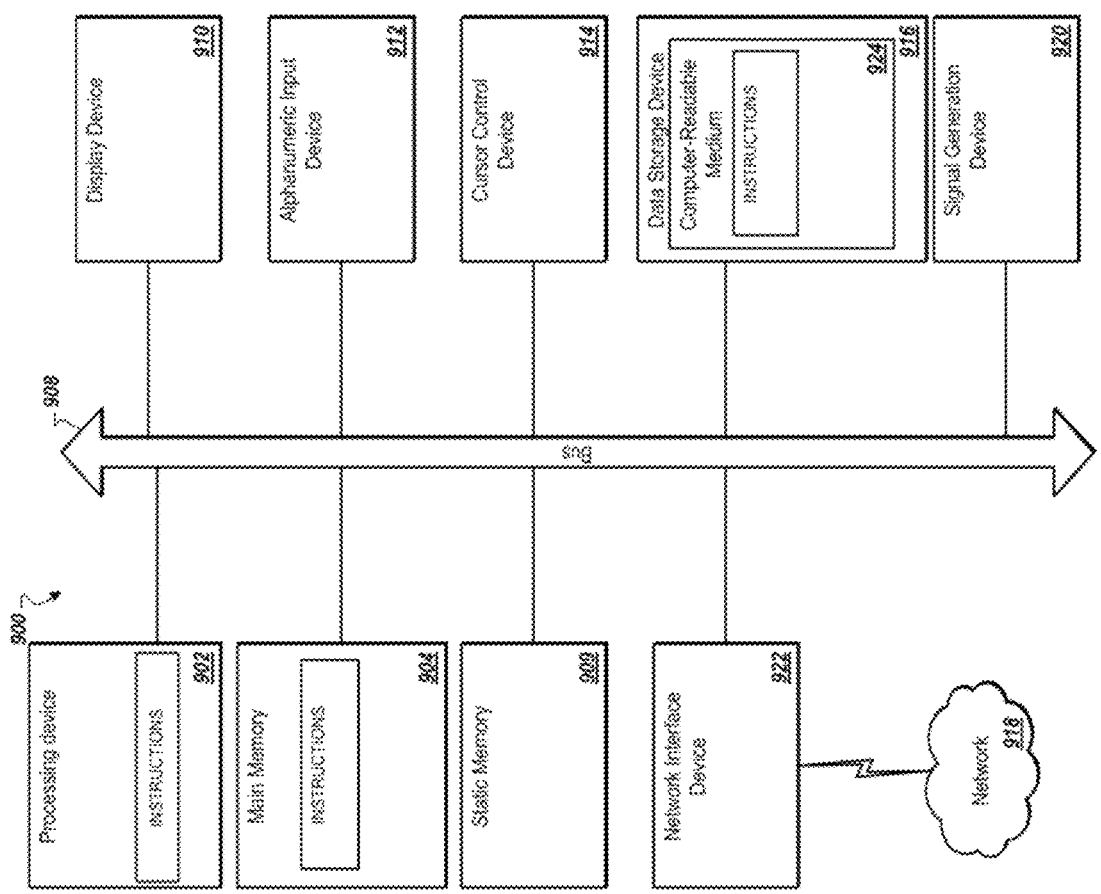
FIG. 9 is a block diagram of an example computer system in which implementations of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) etc.), a static memory 909 (e.g., flash memory, static random access memory (SRAM), etc.), and a data storage device 916, which communicate with each other via a bus 908.

Processing device 902 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute instructions for performing the operations and steps discussed herein.

The computer system 900 may further include a network interface device 922 to communicate over the network 918. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit, a signal generation device (e.g., a speaker) 920, graphics processing unit, video processing unit, and audio processing unit. Some of the units are not specifically shown.

The data storage device 916 may include a machine-readable storage medium 924 (also known as a computer-readable medium) on which is stored one or more sets of instructions or software embodying any one or more of the methodologies or functions described herein. The instructions may also reside, completely or at least partially, within the main memory 904 and/or within the processing device 902 during execution thereof by the computer system 900, the main memory 904 and the processing device 902 also constituting machine-readable storage media.

In one implementation, the instructions include instructions to implement functionality corresponding to the method of determining height, as disclosed herein. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "calculating," "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A computer-implemented method for determining a height of a pattern on a semiconductor wafer, the method comprising:
    obtaining a measured image of the pattern, wherein the measured image of the pattern is indicative of the height of the pattern;
    producing, using a shadow model, a predicted image of the pattern, wherein the predicted image is associated with a function of an estimated height of the pattern, and wherein the estimated height of the pattern is provided as an input to the shadow model; and
    calculating, by a computer processor, the height of the pattern by comparing the measured image of the pattern with the predicted image of the shadow of the pattern.

2. The method of claim 1, wherein obtaining the measured image comprises using collecting image data from one or more side detectors.

3. The method of claim 1, wherein producing the predicted image further comprises:
    producing an occluding contour from planar contours of pattern edges that are determined to be occluding edges.

4. The method of claim 3, wherein the method further comprises:
    for each point of an occluding contour, for each direction, estimating other points that are impacted, and, adding a shadow value to each of the impacted points.

5. The method of claim 4, wherein an edge detection technique is used to identify edge points.

6. The method of claim 4, wherein the method further comprises:
    using the occluding contour to generate the predicted image to be compared with the measured image.

7. The method of claim 6, wherein the method further comprises:
    generating a set of predicted images, each predicted image being associated with a respective estimated height.

8. The method of claim 7, wherein the method further comprises:
    comparing the measured image with each of the predicted images;
    selecting the predicted image that matches most closely with the measured image; and
    using the estimated height associated with the selected predicted image to be the calculated height of the pattern.

9. The method of claim 1, wherein the shadow model is indicative of loss of yield caused by shadowing.

10. A system for determining a height of a pattern on a semiconductor wafer, the system comprising:
    a memory; and
    a computer processor, operatively coupled with the memory, to:
    obtain a measured image of the pattern, wherein the measured image of the pattern is indicative of the height of the pattern;
    produce, using a shadow model, a predicted image of the pattern, wherein the predicted image is associated with a function of an estimated height of the pattern, and wherein the estimated height of the pattern is provided as an input to the shadow model; and
    calculate the height of the pattern by comparing the measured image of the pattern with the predicted image of the shadow of the pattern.

11. The system of claim 10, wherein the measured image of the pattern is produced by collecting image data from one or more side detectors.

12. The system of claim 10, wherein the system produces an occluding contour from planar contours of pattern edges that are determined to be occluding edges.

13. The system of claim 12, wherein, for each point of an occluding contour, for each direction, the system estimates other points that are impacted, and, adds a shadow value to each of the impacted points.

14. The system of claim 13, wherein an edge detection technique is used to identify edge points.

15. The system of claim 13, wherein the occluding contour is used to generate the predicted image to be compared with the measured image.

16. The system of claim 15, wherein a set of predicted images is generated, each predicted image being associated with a respective estimated height.

17. The system of claim 16, wherein the the processor is further to:
    compare the measured image with each of the predicted images;
    select the predicted image that matches most closely with the measured image; and
    use the estimated height associated with the selected predicted image to be the calculated height of the pattern.

18. The system of claim 10, wherein the shadow model is indicative of loss of yield caused by shadowing.

* * * * *

UNITED STATES PATENT AND TRADEMARK OFFICE
CERTIFICATE OF CORRECTION

PATENT NO. : 10,636,140 B2
APPLICATION NO. : 15/982876
DATED : April 28, 2020
INVENTOR(S) : Ishai Schwarzband, Sergey Khristo and Yan Avniel Page 1 of 1

It is certified that error appears in the above-identified patent and that said Letters Patent is hereby corrected as shown below:

In the Claims

In Claim 17, Column 12, Line 44, delete the second "the"

Signed and Sealed this
Twenty-third Day of June, 2020

Andrei Iancu
*Director of the United States Patent and Trademark Office*